United States Patent
Yu et al.

(10) Patent No.: US 7,393,247 B1
(45) Date of Patent: Jul. 1, 2008

(54) ARCHITECTURES FOR EXTERNAL SATA-BASED FLASH MEMORY DEVICES

(75) Inventors: I-Kang Yu, Palo Alto, CA (US); Jim Ni, San Jose, CA (US); Charles C. Lee, Cupertino, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 307 days.

(21) Appl. No.: 11/076,514

(22) Filed: Mar. 8, 2005

(51) Int. Cl.
*H01R 33/00* (2006.01)
(52) U.S. Cl. ...................................... 439/638
(58) Field of Classification Search ................. 439/638, 439/639, 660, 378; 235/432; 361/737; 711/104, 711/62
See application file for complete search history.

(56) References Cited

U.S. PATENT DOCUMENTS

| | | | |
|---|---|---|---|
| 5,330,360 A | 7/1994 | Marsh et al. | |
| 5,339,222 A | 8/1994 | Simmons et al. | |
| 5,386,340 A | 1/1995 | Kurz | |
| 5,420,412 A | 5/1995 | Kowaiski | |
| 5,450,396 A | 9/1995 | Havermans | |
| 5,476,387 A | 12/1995 | Ramey et al. | |
| 5,725,395 A | 3/1998 | Lee et al. | |
| 5,941,733 A | 8/1999 | Lai et al. | |
| 6,027,375 A | 2/2000 | Wu et al. | |
| 6,091,605 A | 7/2000 | Ramey et al. | |
| 6,165,016 A | 12/2000 | Lai | |
| 6,314,479 B1 | 11/2001 | Frederick et al. | |
| 6,334,793 B1 | 1/2002 | Amoni et al. | |
| 6,354,883 B2 | 3/2002 | Jaing | |
| 6,385,677 B1 | 5/2002 | Yao | |
| 6,439,464 B1 | 8/2002 | Fruhauf et al. | |
| 6,453,371 B1 | 9/2002 | Hampson et al. | |
| 6,533,612 B1 | 3/2003 | Lee et al. | |
| 6,561,421 B1 | 5/2003 | Yu | |
| 6,567,273 B1 | 5/2003 | Lie et al. | |
| 6,578,768 B1 | 6/2003 | Binder et al. | |
| 6,581,122 B1 | 6/2003 | Sarat | |
| 6,599,152 B1 | 7/2003 | Oliphant et al. | |
| 6,602,088 B1 | 8/2003 | Zhu | |
| 6,628,498 B2 | 9/2003 | Whitney et al. | |
| 6,658,516 B2 | 12/2003 | Yao | |
| 6,692,268 B2 | 2/2004 | Kung et al. | |

(Continued)

OTHER PUBLICATIONS

PQI., "Intelligent Stick 2.0", Oct. 14, 2004, pp. 1-3, http://www.pqi.com.1w/eng/ourproductlourproduct.h.

(Continued)

*Primary Examiner*—Alexander Gilman
(74) *Attorney, Agent, or Firm*—IP Strategy Group, P.C.

(57) ABSTRACT

A Serial Advanced Technology Attachment-based (SATA-based) flash memory device configured for coupling with a host machine. The device includes semiconductor memory configured for storing data and a plug having therein a plug cavity, the plug cavity having a generally L shape cavity for housing a set of SATA industry-standard signal pins in respective industry-standard positions with respect to the plug cavity. The plug additionally has a set of power pins that includes at least a first power pin. The SATA-based flash memory device employs a SATA protocol for exchanging the data with the host machine using the set of SATA industry-standard signal pins, the SATA-based flash memory device obtaining power via the set of power pins.

24 Claims, 13 Drawing Sheets

U.S. PATENT DOCUMENTS

| | | | |
|---|---|---|---|
| 6,692,312 | B1 | 2/2004 | Semmeling et al. |
| 6,705,902 | B1 | 3/2004 | Yi et al. |
| 6,712,646 | B2 | 3/2004 | Shindo |
| 6,719,570 | B2 | 4/2004 | Tsuchioka |
| 6,745,267 | B2 | 6/2004 | Chen et al. |
| 6,752,321 | B1 | 6/2004 | Leaming |
| 6,758,685 | B1 * | 7/2004 | Huang et al. .......... 439/79 |
| 6,763,408 | B1 | 7/2004 | Sonoda |
| 6,778,401 | B1 | 8/2004 | Yu et al. |
| 6,801,971 | B1 | 10/2004 | Devine et al. |
| 6,813,662 | B2 | 11/2004 | Park |
| 6,854,984 | B1 | 2/2005 | Lee et al. |
| 6,857,897 | B2 | 2/2005 | Conn |
| 6,860,609 | B2 | 3/2005 | Olson et al. |
| 6,871,244 | B1 | 3/2005 | Cahill et al. |
| 6,874,044 | B1 | 3/2005 | Chou et al. |
| 6,890,207 | B2 | 5/2005 | Kobayashi |
| 6,908,038 | B1 * | 6/2005 | Le .......... 235/492 |
| 6,908,330 | B2 * | 6/2005 | Garrett et al. .......... 439/378 |
| 7,104,807 | B1 | 9/2006 | Wang et al. |
| 7,104,848 | B1 | 9/2006 | Chou et al. |
| 7,108,560 | B1 | 9/2006 | Chou et al. |
| 7,125,287 | B1 | 10/2006 | Chou et al. |
| 7,182,646 | B1 | 2/2007 | Chou et al. |
| 7,186,147 | B1 | 3/2007 | Chou et al. |
| 2003/0094490 | A1 | 5/2003 | Lee |
| 2003/0100203 | A1 | 5/2003 | Yen |
| 2003/0104835 | A1 | 6/2003 | Douhet |
| 2003/0145141 | A1 | 7/2003 | Chen et al. |
| 2004/0087213 | A1 | 5/2004 | Kao |
| 2005/0048846 | A1 * | 3/2005 | Suzuki et al. .......... 439/660 |
| 2005/0059301 | A1 | 3/2005 | Chou et al. |

OTHER PUBLICATIONS

"PCI Express" Architecture Initiative Overview, Oct. 2003, pp. 1-30, www.express~lane.org.

Foxconn., "PMCIA Connector," Specifications Sheet, pp. 1.

"Engineering Change Notice: Rounded Chamfer," pp. 1-3.

"Product Specification: PCMCIA Memory Card Connector," Specification No.: PS98007 Rev. 2, Dec. 2, 2001, pp. 1.

Larky et al., "You've Come a Long Way, USB (history and future of USB port technology)," Jul. 23, 2001, Electronics News, pp. 1-2.

Brewer et al., "PCI Express Technology," Feb. 2004, White Paper, Dell, pp. 1-11.

"USB Engineering Change Notice: Pull-up/pull down resistors," pp. 1-5.

"Errata for 'USB Revision 2.0 Apr. 27, 2000' as of May 28, 2002", pp. 1-7, www.usb.org.

Tyco Electronics., "Design Objectives: ExpressCard Connector," 108-5923, Aug. 27, 2003, pp. 1-10.

"USB 2.0 Specification Engineering Change Notice (ECN #1: Mini-B Connector," Oct. 20, 2000, 44 pages.

"Errata for 'USB Revision 2.0 Apr. 27, 2000' as of Dec. 7, 2000," pp. 1-31.

PCMCIA, "ExpressCard(T M) Technology: The New Standard for High-Performance, Low-Cost I/O Expansion for Desktop and Mobile Systems," 1 page. www.expresscard.org.

PCMCIA, "The ExpressCard(T M) Standard—The Next Generation PC Card Technology," Oct. 2003, pp. 1-4.

"USB Engineering Change Notice: Interface Association Descriptors," pp. 1-5.

"On-The-Go Supplement to the USB 2.0 Specification: Revision 1.0a," Jun. 24, 2003, pp. 1-77.

Bhatt et al., "Creating a Third Generation I/O Interconnect," pp. 1-11, www.express-lane.org.

FoxConn, "PMCIA Socket Connector," Specifications, 1 page.

"Electronic Interconnect Devices (Connectors),"9 pages.

Farnell, "Reference Material: A guide to connector terminology," pp. 1-24 pages.

"Diagram for Tyco," 3 pages.

"Connector Supports Removable ExpressCardTM modules," Jun. 27, 2005, 1 page. www.news.thomasnet.com/fullstory/464708.

ExpressCard, "ExpressCard Questions and Answers," Mar. 17, 2006, pp. 1-6 http://www.expresscard.org/web/site/qa.jsp.

PCMCIA, "About PCMCIA," Mar. 17, 2006, pp. 1-5, http://www.pcmcia.org/about.htm.

"ExpressCard: Changing The Face Of Computing," Nov. 24, 2003, pp. 1-3. http://www.elecdesign.com/Articles/Index.cfm?AD=1&ArticleID=6608.

Foxconn, "PCMCIA Connector," 1 page.

U.S. Appl. No. 11/467,137; filed Aug. 24, 2006; Inventors: Chou et al.

U.S. Appl. No. 11/467,134; filed Aug. 24, 2006; Inventors: Chou et al.

U.S. Appl. No. 10/854,004; filed Mar. 25, 2004; Inventors: Chou et al.

"Notice of Office Action," mailed Nov. 14, 2006 for U.S. Appl. No. 11/*467,134; filed Aug. 24, 2006; Inventors Chou et aol.

* cited by examiner

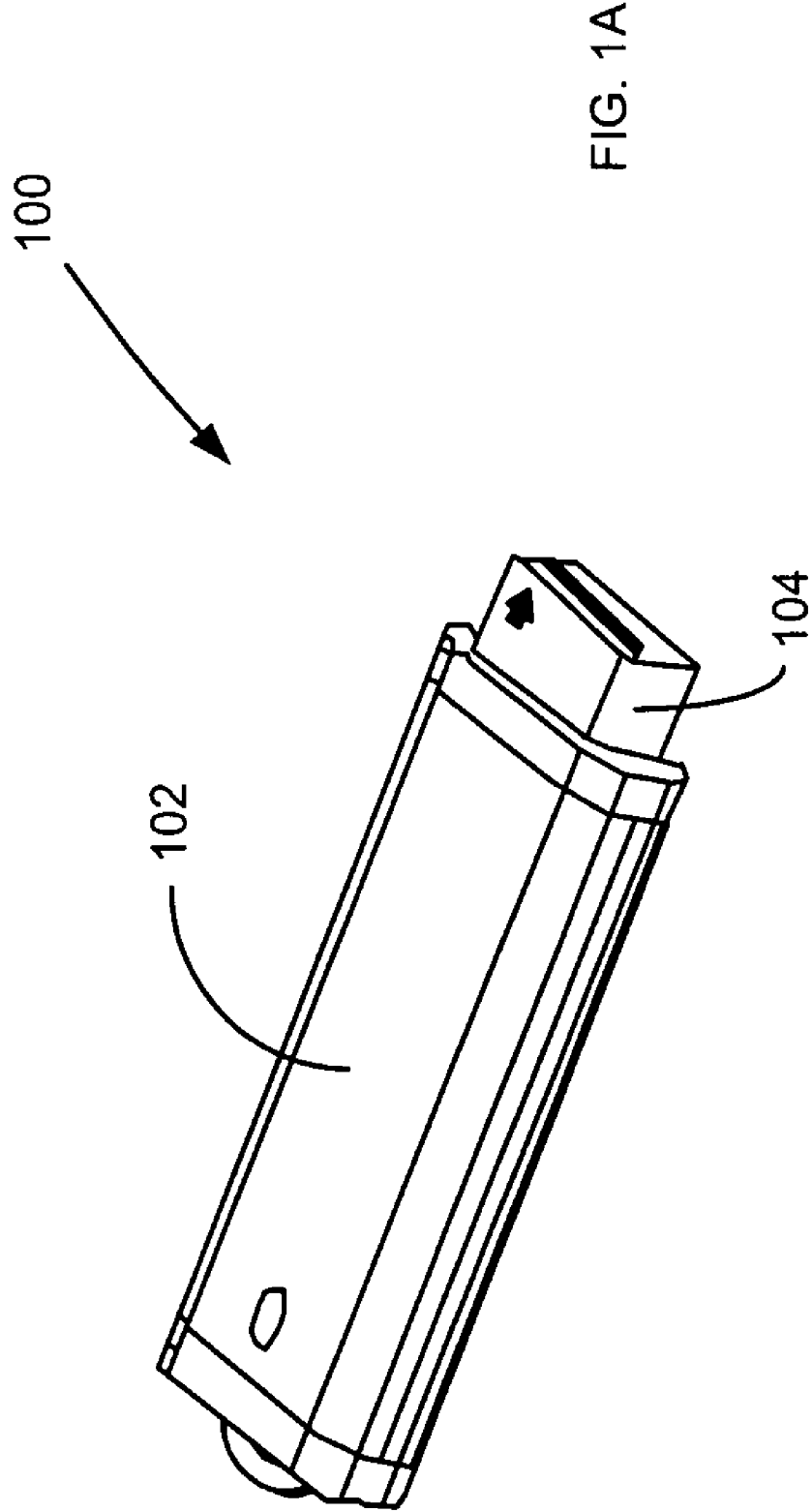

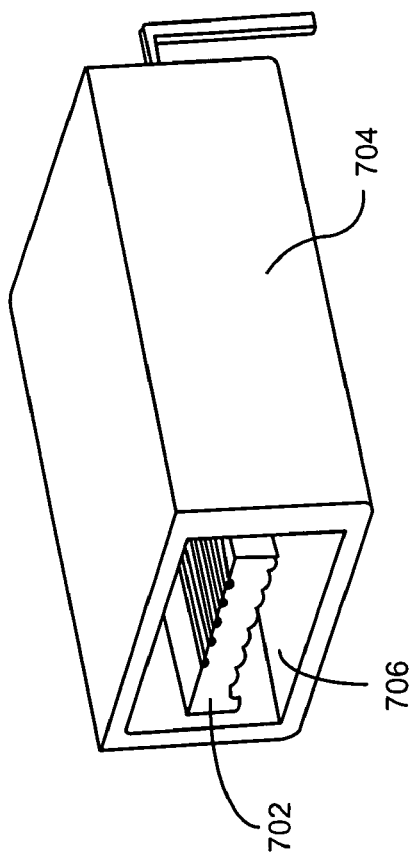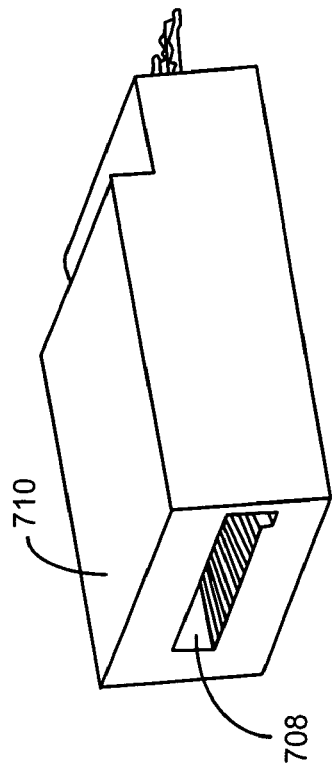
FIG. 7A

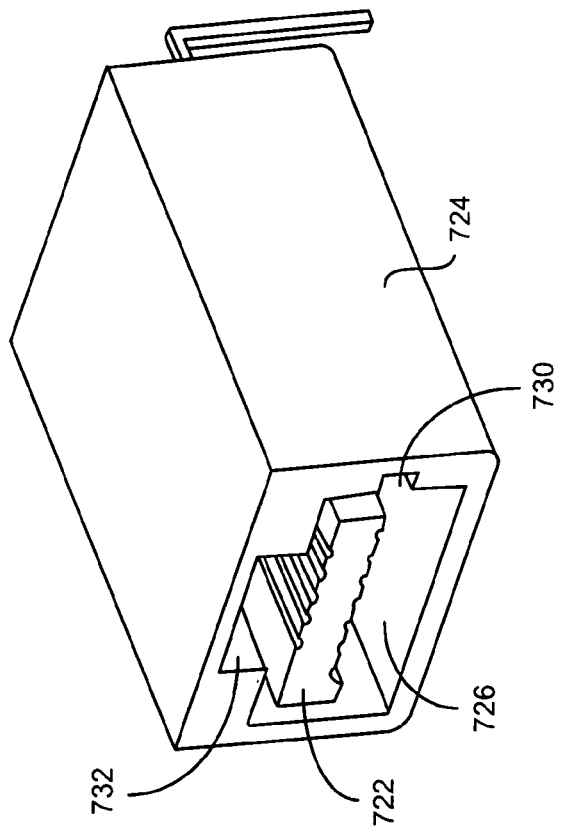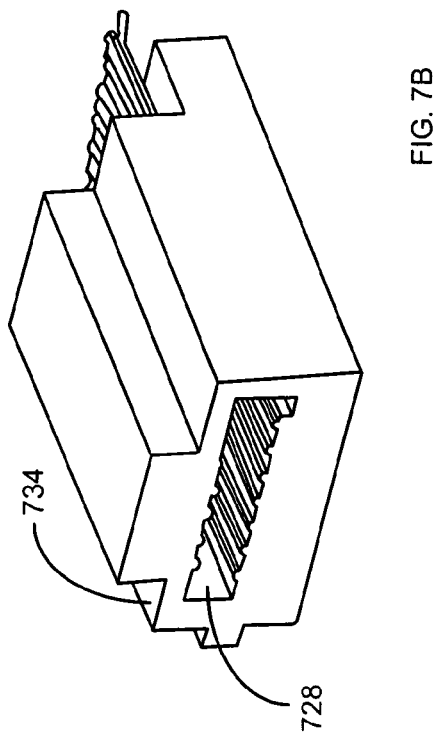
FIG. 7B

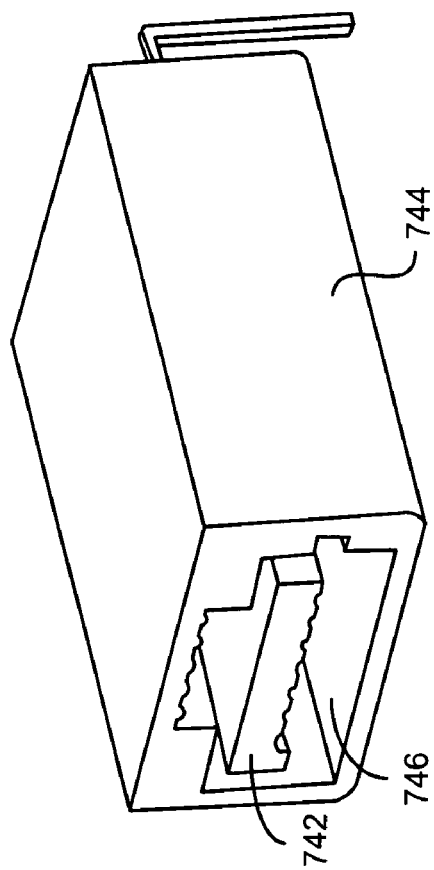
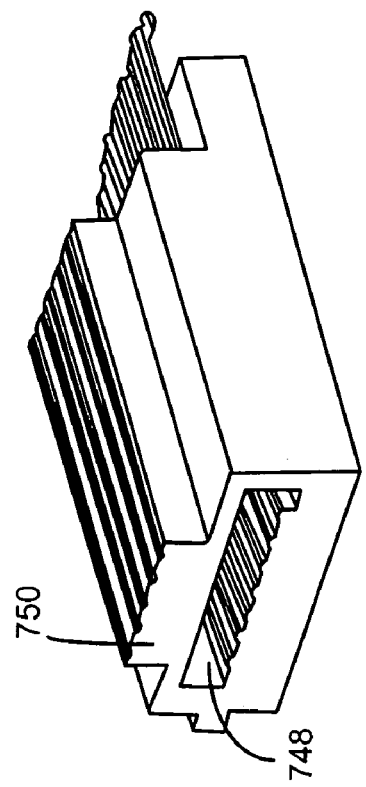
FIG. 7C

ARCHITECTURES FOR EXTERNAL SATA-BASED FLASH MEMORY DEVICES

BACKGROUND OF THE INVENTION

The present invention relates to an external Serial Advanced Technology Attachment-based (external SATA-based) flash memory device. More particularly, the present invention relates to a connector-powered flash memory device that can be connected to a host using the SATA protocol signals.

External flash memory devices have been in use for some time. Generally speaking, a flash memory device employs semiconductor memory instead of a magnetic or optical disk to store data. Well known advantages offered by flash memory include higher performance, enhanced background erasing, buffering, and caching for I/O. Furthermore, flash memory has a high degree of reliability, requires lower power and in general involves less size and weight. Compared to magnetic-based or optical-based memory, flash memory is thought to offer better longevity through bad block management techniques, ECC (Error Correction Code), and wear leveling. Furthermore, flash memory is more suitable for use in rugged environments where exposure to shock, high heat, and/or humidity may be expected. Additionally, flash memory is thought to have a greater future since the density of flash memory has been increasing at a higher rate than the rate of increase in the storage density of magnetic or optical-based memory. Although memory devices may employ any type of semiconductor memory, flash memory devices based NAND gates has been particularly popular.

An external flash memory device typically connects to a host using a connector, such as a Universal Serial Bus (USB) connector and a corresponding protocol. The USB protocol comes in a slower-speed version 1.1 and a higher speed version 2.0 and has been widely employed as an interface between a host and an external flash memory device. While the USB protocol is useful as protocol for transferring data to and from external memory devices, the limited top transfer rate of the USB protocol (roughly 480 Mbits/sec) has become a bottleneck in some situations due to simplex situation and the sharing of bandwidth by multiple USB devices. This bottleneck is exacerbated as flash memory read/write throughput increases.

What is desired, therefore, is an external flash memory device that employs an interface protocol operating at a higher data transfer speed than the transfer speed offered by the USB protocol. The alternative higher speed external flash memory device preferably leverages on an existing high speed protocol specification, while providing backward compatibility.

SUMMARY OF INVENTION

The invention relates, in an embodiment, to a Serial Advanced Technology Attachment-based (SATA-based) flash memory device configured for coupling with a host machine. The device includes semiconductor memory configured for storing data. The device further includes a plug having therein a plug cavity, the plug cavity having a generally L shape cavity for housing a set of SATA industry-standard signal pins in respective industry-standard positions with respect to the plug cavity, at least a subset of the set of SATA industry-standard signal pins being configured to carry address and data signals to facilitate storing the data in the semiconductor memory. The L shape cavity is characterized by a longer substantially rectangular cavity coupled with a shorter substantially rectangular cavity. The plug additionally has a set of power pins that includes at least a first power pin. The SATA-based flash memory device employs a SATA protocol for exchanging the data with the host machine using the set of SATA industry-standard signal pins, the SATA-based flash memory device obtaining power via the set of power pins.

In another embodiment, the invention relates to a Serial Advanced Technology Attachment-based (SATA-based) flash memory arrangement configured for coupling with a host machine. There is included a SATA-based flash memory device having semiconductor memory configured for storing data and a plug having therein a plug cavity. The plug cavity has a generally L shape cavity for housing a set of SATA industry-standard signal pins in respective industry-standard positions with respect to the plug cavity, at least a subset of the set of SATA industry-standard signal pins being configured to carry address and data signals to facilitate storing the data in the semiconductor memory. The L shape cavity is characterized by a longer substantially rectangular cavity joined with a shorter substantially rectangular cavity. The plug additionally has a set of power pins that includes at least a first power pin, the SATA-based flash memory device employing a SATA protocol for exchanging the data with the host machine using the set of SATA industry-standard signal pins, the SATA-based flash memory device obtaining power via the set of power pins. Furthermore, there is included a coupler arrangement having at least three coupler connectors. A first coupler connector of the three coupler connectors is configured for connecting with the plug of the SATA-based flash memory device. A second coupler connector of the three coupler connectors is configured to be coupled with an industry-standard 7-pin SATA receptacle on the host machine. A third coupler connector of the three coupler connector is configured to be coupled a power source on the host machine, the power source representing a connector on the host machine that can provide the power to the set of power pins.

In yet another embodiment, the invention relates to a Serial Advanced Technology Attachment-based (SATA-based) host-side receptacle configured to provide both power and data signals to an external SATA device. The receptacle includes an outer housing and a set of SATA industry-standard signal pins. The receptacle also includes a center portion inside the outer housing, the center portion having a generally L shape island for housing the set of SATA industry-standard signal pins in respective industry-standard positions with respect to the center portion, at least a subset of the set of SATA industry-standard signal pins being configured to permit communication with the external SATA device using a SATA protocol. The receptacle further includes a set of power pins that includes at least a first power pin, the set of power pins being disposed inside the outer housing and configured to provide the power to the external SATA device, whereby the SATA-based host-side receptacle is configured to be backward compatible with an industry-standard 7-pin SATA plug and the set of power pins is positioned inside the center portion such that they are electrically isolated from pins of the industry-standard 7-pin SATA plug when the industry-standard 7-pin SATA plug is plugged into the SATA-based host-side receptacle.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A shows, in accordance with an embodiment of the present invention, a typical ESATA-FMD including a housing and a plug.

Figure 3:
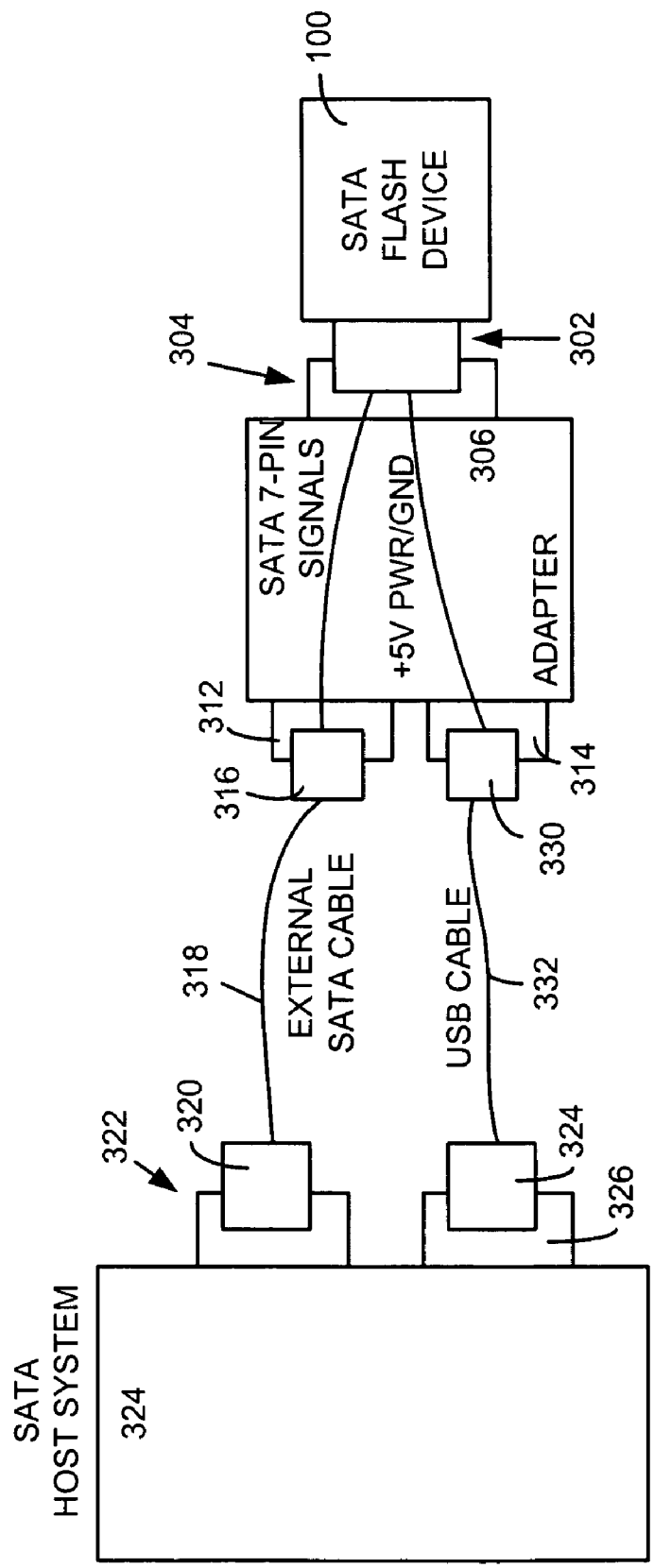

The USB-powered embodiment is illustrated in FIG. 3.

Figure 4:
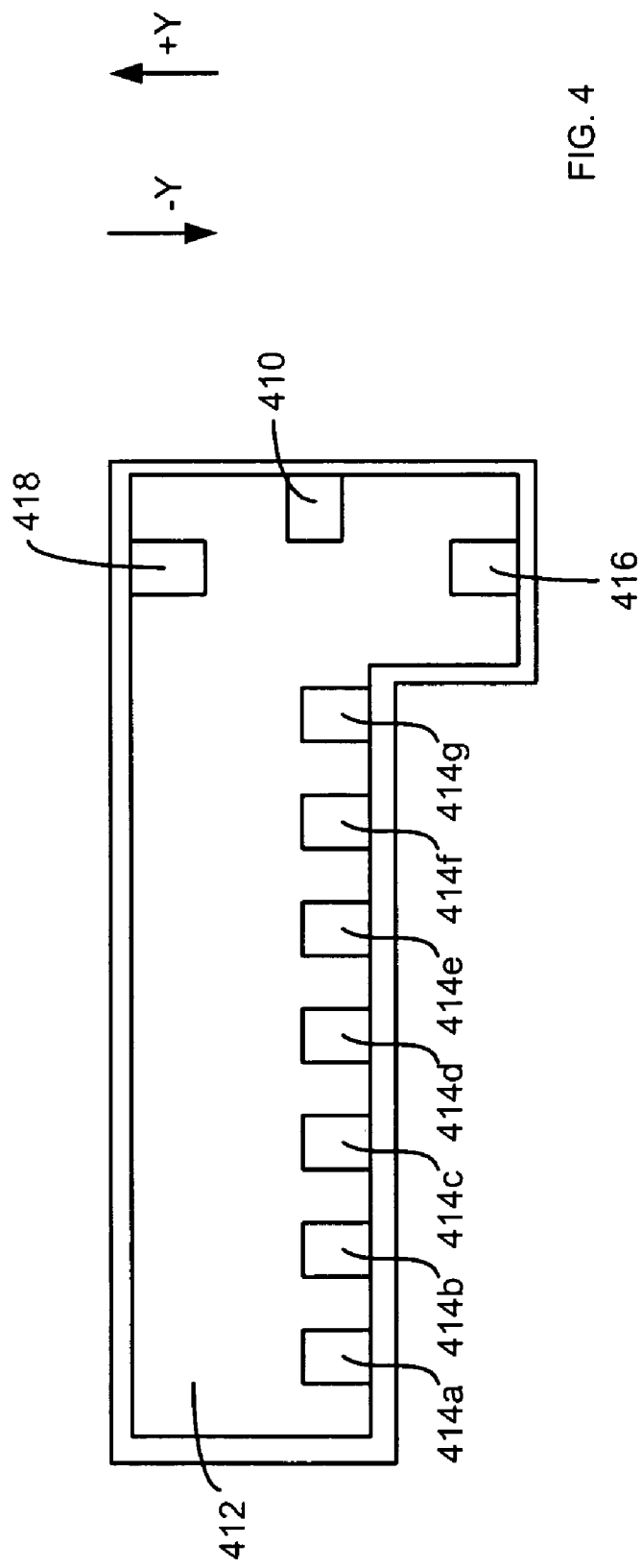

FIG. 4 shows, in an embodiment, how the additional pin or pins may be provided to handle the power and/or ground requirements of a connector-powered ESATA-FMD.

Figure 5:
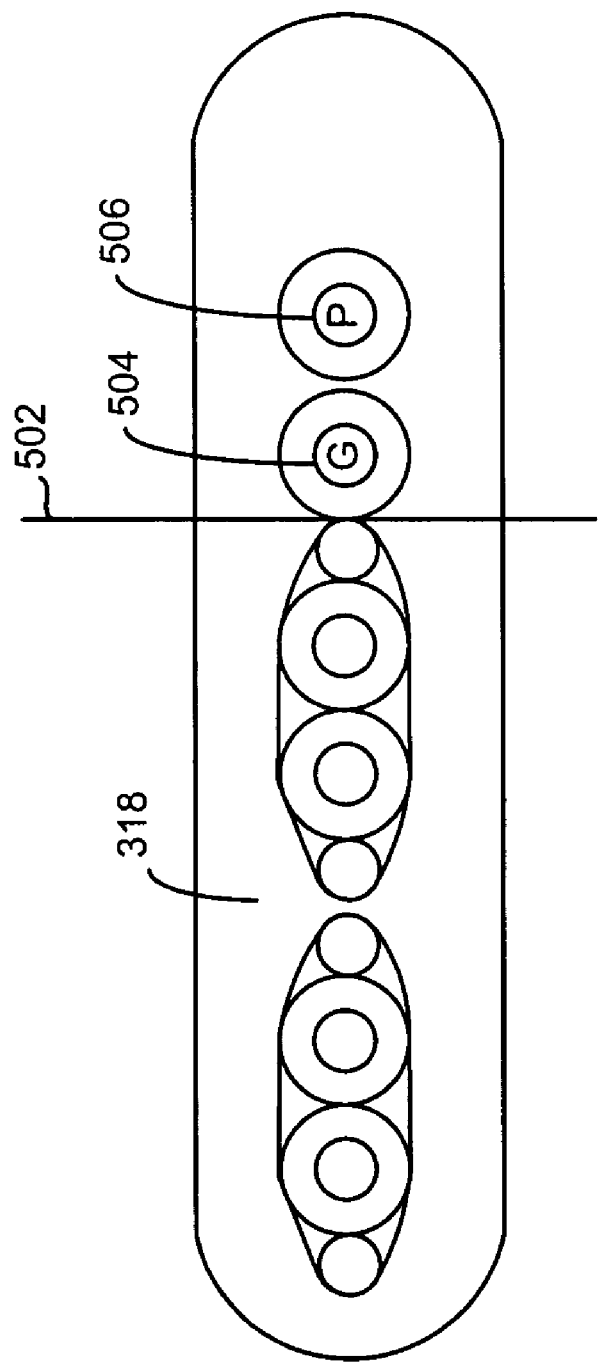

FIG. 5 shows, in accordance with an embodiment, an implementation of an external SATA cable.

Figure 6:
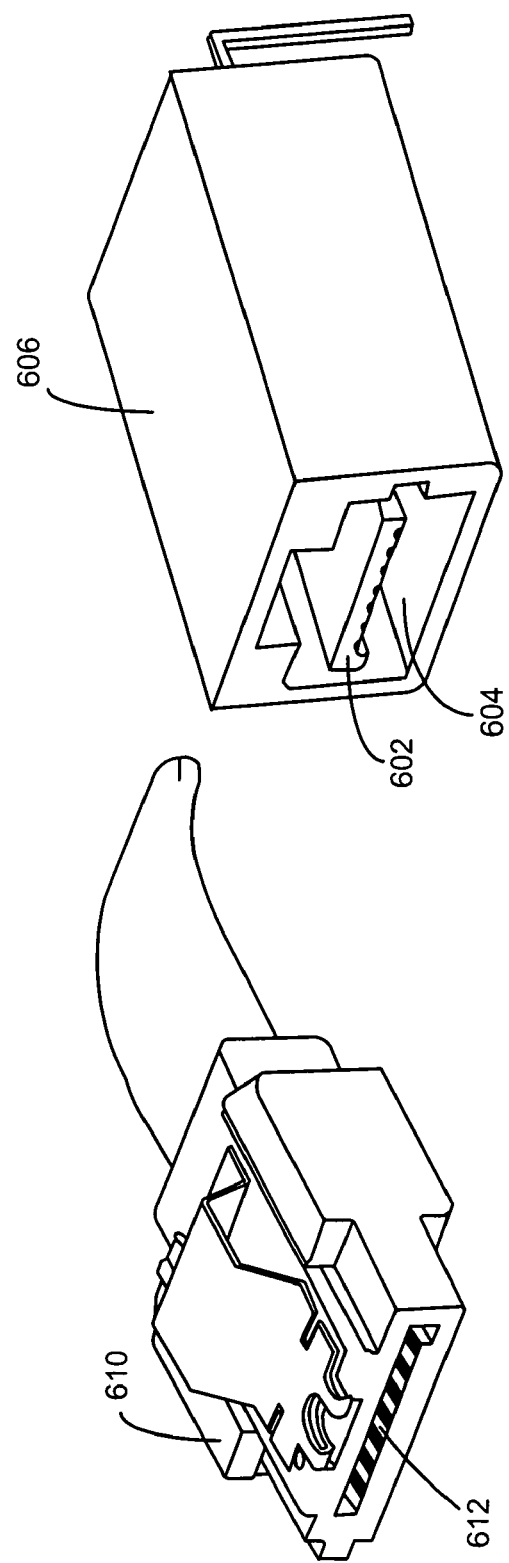

For reference purposes, FIG. 6 shows a center island, surrounded by a receptacle cavity in an industry-standard SATA receptacle.

In FIG. 7A, additional pins to accommodate power and/or ground are provided, in accordance with an embodiment of the present invention, on top of center island of extended SATA receptacle.

In FIG. 7B, the shape of the receptacle cavity of the extended SATA receptacle includes a guide rail and a key portion in order to allow the receptacle to be mechanically compatible with industry-standard SATA plugs, in accordance with an embodiment of the present invention.

In FIG. 7C, additional pins to accommodate power (+5V) and/or ground are provided along the interior wall of the key portion of the receptacle cavity of the extended SATA receptacle, in accordance with an embodiment of the present invention.

Figure 7D:
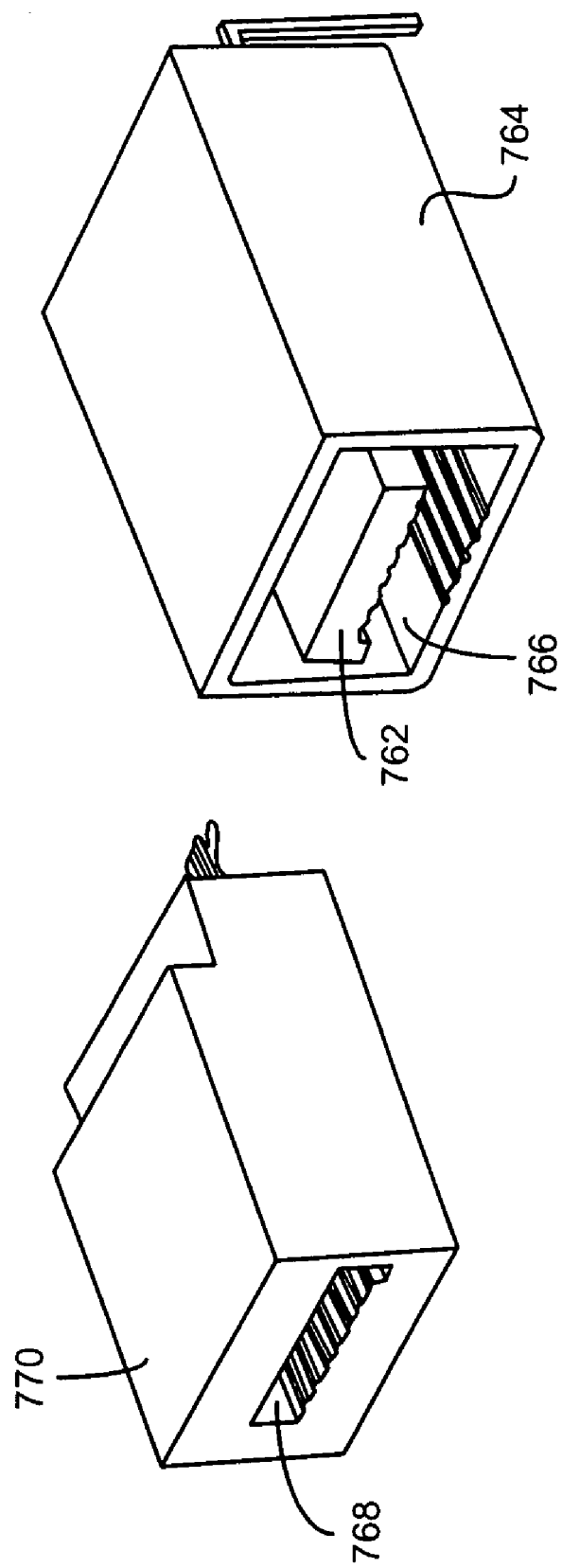

In FIG. 7D, additional pins to accommodate power (+5V) and ground are provided at the bottom of receptacle cavity opposite the signal pins attached to the center island of the extended SATA receptacle, in accordance with an embodiment of the present invention.

Figure 8:
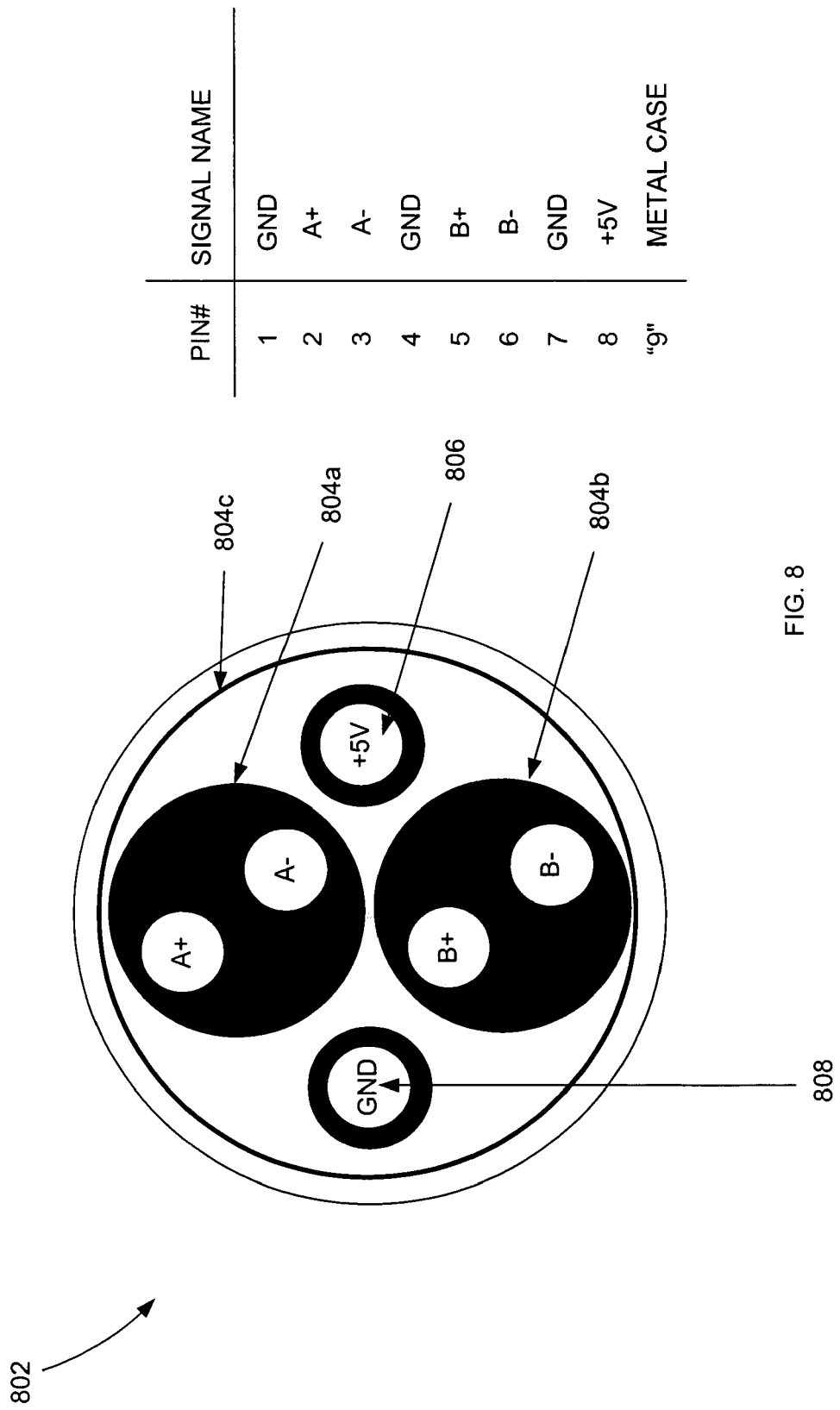

FIG. 8 shows, in an embodiment of the invention, a cable implementation for providing signal, power, and ground conductors to the single extended SATA connector of the ESATA-FMD.

Figure 9:
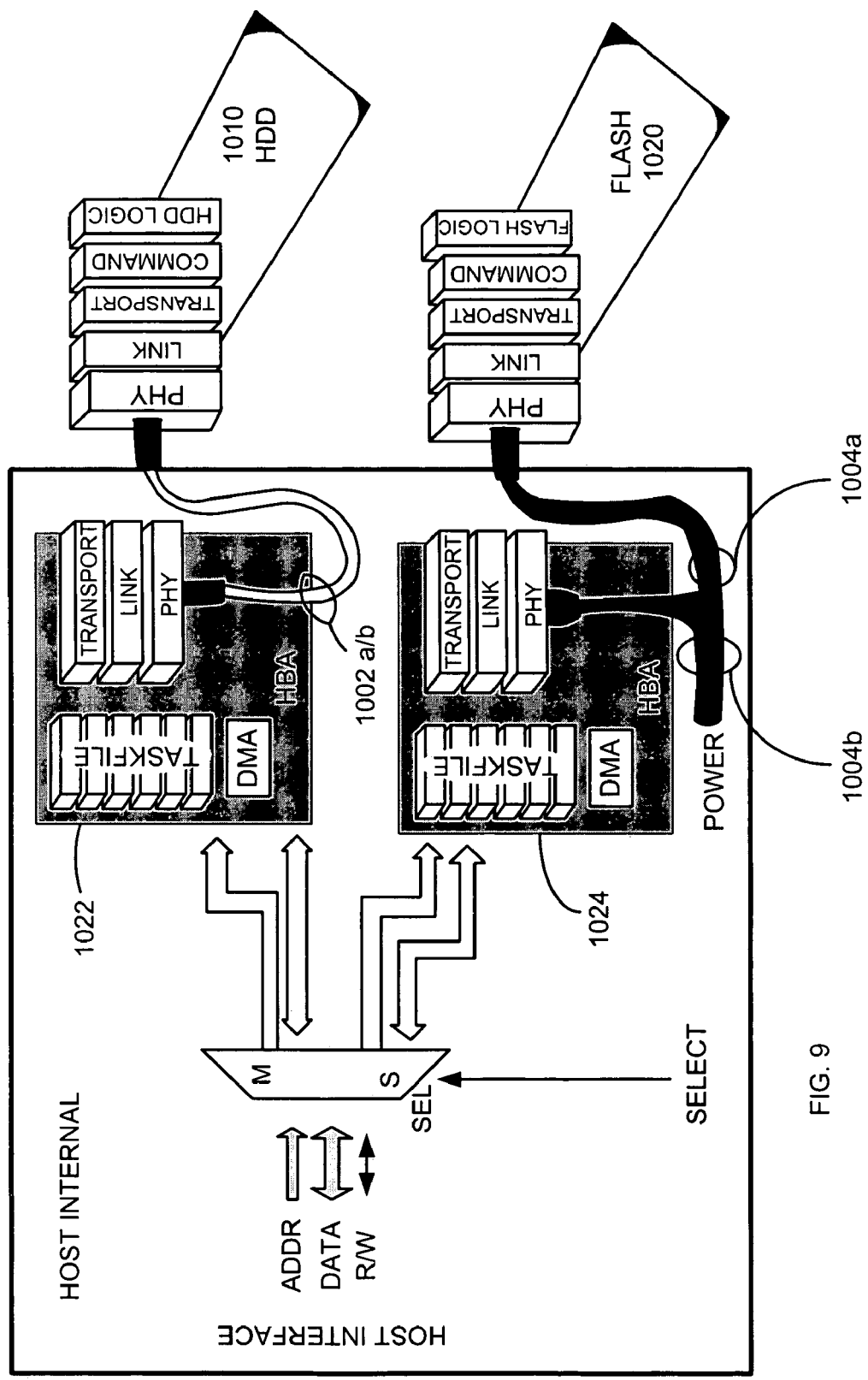

FIG. 9 shows a hypothetical system that has an internal hard disk implemented via a first SATA receptacle and a ESATA-FMD implemented via a second SATA receptacle.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover articles of manufacture that includes a computer readable medium on which computer readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general purpose computer and/or a dedicated computing device when appropriately programmed and may include a combination of a computer/computing device and dedicated/programmable circuits adapted for the various tasks pertaining to embodiments of the invention.

While there are different competing protocols in the marketplace, including for example PCI-X (PCI-Express), Serial Attached Small-Computer System Interface (SAS), IEEE 1394 (Firewire), Serial-Advanced-Technology-Attachment (SATA), and others, there have been many challenges to the adoption of one of these alternative protocols for transferring data to/from an external flash memory device.

Of the aforementioned alternative protocols, SATA (both SATA-I and SATA-II) is of particular interest to the inventors since SATA is widely employed in today's desktop and laptop computers and is expected to enjoy even greater popularity in future generations of computing devices. SATA, being a serial connection, enjoys, among other advantages, the efficiency of a lower pin count as well as better RAS (Reliability, Availability, and Serviceability) characteristics. SATA's transfer rate of up to 3 Gb/s is highly attractive as a higher speed alternative to the relatively slow USB protocol.

There are, however, challenges associated with the adoption of SATA as an alternative interface protocol for external flash memory devices. For one, consumers are conditioned to expect the convenience of a connector-powered flash memory device (defined herein as one that employs a single connector for both signals and power). Since the highly popular USB-based flash memory device derives its power from its connector, any proposed alternative protocol needs to also provide power through the single connector to the external flash memory device (hence the term "connector-powered flash memory device") in order to be successful in the marketplace.

Unfortunately, SATA was originally designed as a protocol for transferring data to and from hard disks. Accordingly, the SATA specification does not specify bus power, which is required for a connector-powered flash memory device that has both its signal and power pins in a single connector. This is because historically, the high power requirement of a hard disk drive, including for example the amount of power required to spin the disks and to rapidly accelerate and decelerate the R/W head-containing actuator arm assembly, precludes the use of a single connector to provide both signal pins (i.e., pins that provide control, data, and address signals) and power pins (i.e., pins that provide ground, +5V, and the like). The high current consumed by the external hard disk drive also contributes to a voltage drop to a level unacceptable in external hard disk drive. The high current through the power conductors and pins would have presented unacceptable interference to the adjacent signal conductors and pins if they were all disposed in a single cable or a single connector.

Accordingly, in a typical SATA-based hard disk arrangement, a 7-pin SATA connector is typically employed to provide signals to the hard disk, while a separate 15-pin connector is employed to provide ground, +3.3V, +5V, and +12V to the hard disk. Since 22-pins are somewhat costly, fragile, and in general impractical to implement on a consumer-oriented portable external flash memory device (whose form factor may be as small as a 5-stick pack of chewing gum), an alternative plug and receptacle design is required to allow SATA to be employed as an external flash memory device protocol.

While external SATA-based hard disks are currently available, these external SATA-based hard disks are bulky and require a separate power connection to a wall receptacle to provide sufficient power for hard disk operation. The requirement of a separate power connection renders the industry-standard SATA external interface, such as that defined by the Serial ATA Group, inappropriate for use as an interface for a consumer-oriented flash memory device since consumers typically expect for both power and signals to be provided via a single connector with the host.

The inventors also recognize that SATA offers a tremendous degree of flexibility since the SATA specification has built-in provisions for achieving compatibility with different brands and different types of hard disks. In particular, the firmware and controller of a SATA host and device can, by design, be easily modified. Accordingly, SATA's flexibility renders the SATA protocol a more attractive candidate for adaptation to flash memory devices than some other higher speed protocols.

In embodiments of the invention, an external SATA flash memory architecture is disclosed. The ESATA-FMA (External SATA flash memory architecture) includes innovative arrangements for providing power to the external SATA flash memory device (ESATA-FMD) from the SATA host.

Alternatively or additionally, the ESATA-FMA includes innovative connectors (including receptacles and/or plugs) for the SATA host and the ESATA-FMD. These innovative receptacle and plug arrangements allow the ESATA-FMD to be connector-powered, i.e., to derive power for storing data on flash memory from the single device-side connector that is also used to provide the data and control signals. In an embodiment, the improved SATA-based receptacle is electrically and mechanically backward compatible with existing SATA devices to allow existing SATA devices to employ the improved SATA-based receptacle to communicate with the SATA host as if the improved SATA-based receptacle is an industry-standard SATA receptacles.

Alternatively or additionally, the ESATA-FMA includes innovative hardware and/or software architectures to facilitate data storage on flash memory. These innovative hardware and/or software architectures allow SATA, which is a protocol for interacting with hard disks, to be employed for storing data on flash memory devices.

Alternatively or additionally, the ESATA-FMA includes innovative techniques for flash memory management, including enhanced error handling.

These and other features and advantages of the present invention may be better understood with reference to the figures and discussions that follow.

FIG. 1A shows, in accordance with an embodiment of the present invention, a typical ESATA-FMD 100 including a housing 102 and a plug 104. Housing 102 is typically made from a durable material, such as metal or plastic, and protects the circuit board that implements the flash controller circuitry, the flash memory components (chips) themselves, as well as other control circuitry (such as clock, power management, LEDs, etc) therein. Plug 104 is configured to obtain SATA signals from a SATA host to facilitate reading/writing data to/from the flash memory components. Further, plug 104 includes power and ground pins. Thus, unlike the prior art SATA connector, the single connector of the ESATA-FMD includes both the signal (i.e., data and control) pins and the power/ground pins, rendering the ESATA-FMD a consumer-friendly device. Plug 104 may have many different variations and will be discussed later herein.

Figure 1B:
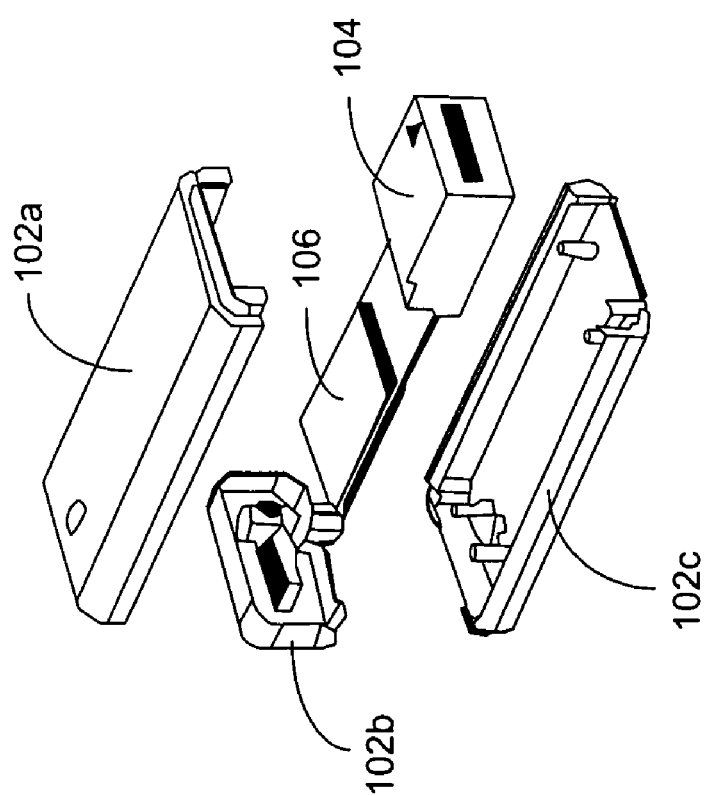
FIG. 1B shows, in accordance with an embodiment of the present invention, an exploded view of the ESATA-FMD of FIG. 1A.

FIG. 1B shows an exploded view of ESATA-FMD 100 of FIG. 1A, including the multi-part housing 102 (shown by reference numbers 102a, 102b, and 102c in FIG. 1B). Plug 104 is shown coupled to a substrate board 106 on which the aforementioned flash controller circuitry, flash memory components, and other control circuitry are implemented. Substrate board 106 may be centered with respect to plug 104, thereby enabling integrated circuits and other components to be disposed on both sides of substrate board 106. Alternatively, substrate board 106 may be offset relative to plug 104, allowing thicker integrated circuits to occupy one side of the substrate board. In either case, mechanical balance is achieved for stability.

Figure 2:
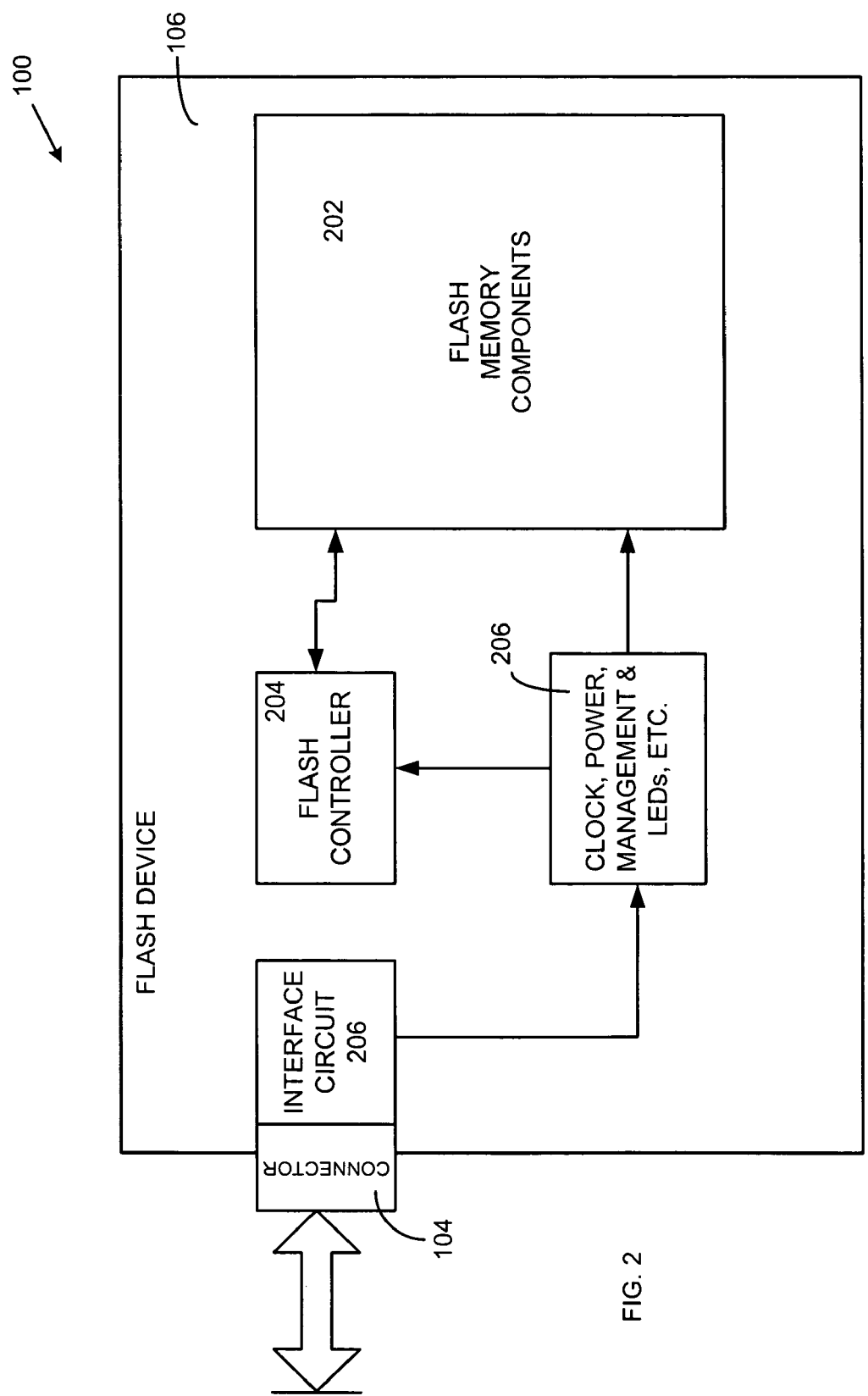
FIG. 2 shows, in accordance with an embodiment of the present invention, an architecture representation of ESATA-FMD, including substrate board and SATA-based plug.

FIG. 2 shows, in accordance with an embodiment of the present invention, an architecture representation of ESATA-FMD 100, including substrate board 106 and SATA-based plug 104. There are shown disposed on substrate board 106 flash memory component 202, representing for example the NAND-based memory chips, and a flash controller circuit 204 coupled thereto. Both flash memory component 202 and flash controller 204 are conventional and widely available from component vendors of flash memory devices.

There is also shown a control circuit 206 which may implement, for example, clock, power management, and other features such as light emitting diodes (LEDs), etc. Flash controller 204 is shown coupled with an interface circuit 210, which facilitates electrical coupling between flash controller 204 and control circuit 206 with a SATA-based plug 104 for communication with a corresponding SATA-based receptacle on the SATA host. In an embodiment, flash controller 204 and interface circuit 210 may be integrated into a single controller chip instead of being implemented as two separate circuits as shown in FIG. 2 (or as a set of separate circuits—not shown).

As mentioned, one of the challenges of adapting the SATA protocol to an external flash memory device involves the provision of power (e.g., +5V or another power voltage level depending on the technology of the semiconductor memory component) to the ESATA-FMD. In the examples herein, +5V is assumed to be the voltage level required although the disclosure can be readily adapted to acquire other voltages for use by the circuitry within the ESATA-FMD. The challenge is present since SATA, as mentioned, does not provide an integrated bus power pin.

In an embodiment, power is obtained from either a keyboard connector on the host computer or from an existing USB connector (or another connector) on the host system. The USB-powered embodiment is illustrated in FIG. 3. In FIG. 3, ESATA-FMD 100 has a plug 302, which is connected to a receptacle 304 of an adapter 306. Plug 302 may have an L-shape plug cavity analogous to that in an industry-standard SATA plug except that power and ground are also provided through plug 302 in addition to the signals on the 7 pins of the industry-standard SATA connector. Accordingly, the coupler arrangement between ESATA-FMD 100 and host system 324 may be thought of as having at least three couplers connectors for connecting to plug 302 of ESATA-FMD 100, to an industry-standard 7 pin SATA receptacle 320, and to a power source on the host machine (USB port 326 in the example of FIG. 3).

FIG. 4 shows, in an embodiment, how the additional pin or pins may be provided to handle the power and/or ground requirements of a connector-powered ESATA-FMD. An additional power pin 410 may be provided along the base leg of the "L" in the L-shaped cavity 412 of the plug such that the contacting surface of the additional power pin 410 faces the sides of the row of signal pins (414a-414g). For ease of understanding, the plug cavity that is substantially L-shaped may be considered to comprise two parts: a longer substantially rectangular cavity coupled with or joined with a shorter substantially rectangular cavity. The additional set of power pins (which may be a single power pin or may be multiple power and/or ground pins) are disposed along the inner walls of this shorter substantially rectangular cavity, as shown in FIG. 4.

Signal pins 414a-414g represent SATA industry-standard signal pins for carrying data/address signals and are disposed in industry-standard positions (i.e., in the positions expected within the plug cavity if these SATA industry-standard signal pins were associated with an industry-standard SATA device to facilitate coupling with counterpart pins in an industry-standard SATA receptacle). In these positions, signal pins 414a-414g can electrically couple with receptacle pins of an ESATA receptacle that is also backward compatible with an industry-standard SATA plug.

Alternatively or additionally, an additional power pin 416 may be provided along the shorter vertical inner surface of the "L" in the L-shaped cavity 412 such that the contacting surface of the additional power pin 416 faces in the same general direction (+y in FIG. 4) as contacting surfaces of the row of signal pins (414a-414g). Alternatively or additionally, an additional power pin 418 may be provided along the longer inner surface of the "L" in the L-shaped cavity 412 such that the contacting surface of the additional power pin 418 faces in the opposite direction (−y in FIG. 4) as contacting surfaces of the row of signal pins (414a-414g). Multiple power pins may be desirable for higher power needs. Although an ESATA receptacle corresponding to the ESATA plug is not shown, it should be understood that the additional power pin(s) would be provided on the center island of such ESATA receptacle to permit these power pins to mate with their counterparts in the ESATA plug.

In an embodiment, a USB-like metal enclosure may be provided outside of the extended SATA plug and/or the extended SATA receptacle to improve electro-static discharge (ESD) characteristics as well as to provide a ground path. In an embodiment, the electrical mating sequence between the plug pins and the corresponding host-side receptacle pins is accomplished in a two-stage fashion with no precharge required for the power/ground pins.

Referring back to FIG. 3, power and ground are provided to plug 302 through receptacle 304 on an adapter 306. Receptacle 304 is mechanically and electrically compatible with the aforementioned plug 302. Receptacle 304 may, alternatively or additionally, assume the general shape of an industry-standard SATA receptacle, except that additional pin(s) corresponding to the additional power pin(s) in its counter-part plug is/are provided.

As shown in FIG. 3, the 7 signal pins of receptacle 304 are obtained from a SATA receptacle 312 while the 2 power/ground pins of receptacle 304 are obtained from a USB receptacle 314. SATA receptacle 312 is in turn coupled to a SATA plug 316, which is coupled via an external SATA cable 318 to a SATA plug 320. As can be seen, SATA plug 320 is coupled to an industry-standard SATA receptacle 322 of host system 324, thereby coupling with the 7 signal pins of SATA receptacle 322 of host system 324.

USB receptacle 314 is coupled to a USB plug 330, which is coupled via an external USB cable 332 to a USB plug 324. USB plug 324 is coupled to an industry-standard USB receptacle 326, thereby allowing plug 302 to obtain the power (+5V) and ground pins from industry-standard USB receptacle 326. Generally, adapter 306, cables 318 and 332, and associated receptacle 304 and plugs 320 and 324 form a "Y" shaped adapter arrangement for allowing ESATA-FMD 100 to obtain power, ground, and signals from a an industry-standard host SATA receptacle and another receptacle and to receive the power, ground, and signals through a single extended SATA plug 302. One skilled in the art would readily appreciate that the conductors of external SATA cable 318 may, in an embodiment, be directly connected to the SATA traces in adapter 306 without using SATA plug 316 and SATA receptacle 312. Likewise, the two power and ground conductors of external USB cable 332 may, in an embodiment, be directly connected to the power and ground traces in adapter 306 without using USB plug 330 and USB receptacle 314.

FIG. 5 shows, in accordance with an embodiment, an implementation of external SATA cable 318 of FIG. 3. Conductors on the left of line 502 are conventional SATA conductors. Additional ground conductor 504 and power (+5V) conductor 506 from the host USB receptacle are shown. These additional conductors may be, in an embodiment, between 20 to 28 AWG in thickness. Each conductor in cable 318 may be disposed in an appropriate insulation jacket (e.g., foam polyolefin) and the entire cable may also be disposed in an appropriate insulation jacket (e.g., PVC).

Although FIGS. 3 and 4 show that power and ground for the ESATA-FMD may be obtained from the USB receptacle of the host, it may be possible to obtain power and ground from another connector on the host, such as one provided for the keyboard or for another external peripheral device.

In some embodiments, the source for power and ground may be obtained from the 15-pin SATA power connector itself, such as the internal 15-pin SATA power connector provided by the SATA specification. As is known, the SATA specification provides for a 15-pin connector in which power, ground, and pre-charge pins are provided. This 15-pin power connector is separate from the 7-pin signal connector in the industry-standard SATA specification. In an embodiment, the additional pins are provided such that an extended SATA receptacle (i.e., one that also contains the additional ground and power pins) on the host can accommodate an ESATA-FMD while staying backward compatible with industry-standard SATA devices, such as an external hard disk.

In an embodiment, the extended SATA receptacle is provided with additional pins such that the 7-existing signal pins and the additional power/ground pins form two parallel rows. For reference purposes, FIG. 6 shows a center island 602, surrounded by a receptacle cavity 604 in an industry-standard SATA receptacle 606. For completeness, a counterpart industry-standard SATA plug 610 is also shown, along with a plug cavity 612 therein. To create an extended SATA plug, additional power and ground pins may be provided on center island 602 or disposed along the walls of receptacle cavity 604. Various exemplary implementations of this design are shown in FIGS. 7A-7D herein.

For ease of understanding, the center island of the ESATA receptacle that is substantially L-shaped may be considered to comprise two parts: a longer substantially rectangular portion coupled with or joined with a shorter substantially rectangular portion. In some embodiments herein, the additional set of power pins (which may be a single power pin or may be multiple power and/or ground pins) are disposed adjacent to a wall of the center island. In other embodiments herein, the additional set of power pins (which may be a single power pin or may be multiple power and/or ground pins) are disposed adjacent to other walls that are not part of the center island but are inside the receptacle cavity.

In FIG. 7A, additional pins to accommodate power (+5V) and/or ground are provided on top of center island 702 of extended SATA receptacle 704. Corresponding pins are provided in the plug cavity 708 of an extended SATA plug 710. If desired, a portion or all of one or both of extended SATA plug 710 and extended SATA receptacle 704 may be clad with a metal housing in order to improve ESD characteristics. In an embodiment, such metal housing(s) may not be used for grounding purposes. In another embodiment, such metal housing(s) may be employed for grounding.

In FIG. 7B, the shape of receptacle cavity 726 of extended SATA receptacle 724 includes a guide rail 730 and a key portion 732 in order to allow receptacle 724 to be mechanically compatible with industry-standard SATA plugs. Corresponding additional pins to accommodate power (+5V) and/or ground are also provided on top of center island 722 of extended SATA receptacle 724. Corresponding pins are provided in the plug cavity 728 of an extended SATA plug 734. If desired, a portion or all of one or both of extended SATA plug 734 and extended SATA receptacle 724 may be clad with metal housing(s) in order to improve ESD characteristics. Note that in an embodiment, such metal housing(s) may not be used for grounding purposes. In another embodiment, such metal housing(s) may be employed for grounding.

In FIG. 7C, additional pins to accommodate power (+5V) and/or ground are provided along the interior wall of the key portion of receptacle cavity 742 of extended SATA receptacle 744. Corresponding pins are provided in the plug cavity 748 of an extended SATA plug 750. If desired, a portion or all of one or both of extended SATA plug 750 and extended SATA receptacle 744 may be clad with a metal housing in order to improve ESD characteristics. In an embodiment, such metal housing(s) may not be used for grounding purposes. In another embodiment, such metal housing(s) may be employed for grounding.

In FIG. 7D, additional pins to accommodate power (+5V) and ground are provided at the bottom of receptacle cavity 766 opposite the signal pins attached to center island 762 of extended SATA receptacle 764. Corresponding pins are provided on extended SATA plug 770. If desired, a portion or all of one or both of extended SATA plug 770 and extended SATA receptacle 764 may be clad with a metal housing in order to improve ESD characteristics. In an embodiment, such metal housing(s) may not be used for grounding purposes. In another embodiment, such metal housing(s) may be employed for grounding.

In some implementations of FIGS. 7A-7D, power and ground pins may be obtained from pins 4 and 6 (for ground), pin 7 (for pre-charge) and pins 8 and 9 (for +5V) of the 15-pin industry-standard power connector. One skilled in the art may readily appreciate that other pins of the 15-pin industry-standard SATA power connector may also be employed to provide the required power and ground. In various embodiments, the design of receptacle cavities 706, 726, 746, and 766 may be configured to also be mechanically compatible with an industry-standard SATA plug. For example, all extended SATA receptacles of FIGS. 7A-7D may optionally be provided with a plug guide rail (seen as guide rail 730 in FIG. 7B) and appropriately dimensions for key 732 as well as the remainder of receptacle 726 to allow an industry-standard SATA device to plug into the extended SATA receptacle.

Since the industry-standard SATA plug lacks corresponding pins to couple with the additional power/ground pins of the extended SATA receptacle, electrical compatibility with existing SATA devices is maintained. In the case of FIG. 7C, the additional power/ground conductors may be protected from being shorted by the metal clip of the industry-standard SATA plug by disposing these conductors in trenches or protecting these conductors using adjacent raised insulator berms such that these conductors are electrically isolated from the metal clip of the industry-standard SATA plug when such industry-standard SATA plug is inserted into the extended SATA receptacle.

In an embodiment, pins 1, 4, and 7 of the industry-standard SATA power connector provides return ground, while pin 8 provides the required +5V. A+ and A− signals are provided by pins 2 and 3 respectively. Pins 5 and 6 provide B+ and B− signals respectively.

FIG. 8 shows, in an embodiment of the invention, a cable implementation for providing signal, power, and ground conductors to the single extended SATA connector of the ESATA-FMD. Generally speaking, the design of cable 802 in FIG. 8 follows IEEE 1394a (Firewire) design principles (i.e., voltage mode versus current mode as in USB cables) in that the ESD shielding around the signal conductor pairs (A+/A−, B+/B−), as well the overall cable, is provided by metal shields (804a, 804b, and 804c). The signal conductors may be formed from, for example, tinned copper wire of around 20-28 AWG in thickness.

The signal conductors may be wrapped in an insulator, such as foam polyolefin, and each pair (i.e., A+/A− and B+/B−) may be wrapped with aluminized polyester. Power conductor 806 and ground conductor 808 (around 20-24 AWG) are also shown and may be wrapped in an insulator such as foam polyolefin. If desired, multiple power conductors may be provided to improve current sourcing. All conductors may be shielded in aluminized polyester, heat sealed, and then disposed in an outer jacket made from an appropriate insulator material, such as PVC.

As can be recalled from the discussion of FIG. 2, the ESATA-FMD includes both a SATA interface circuit 210 and an extended SATA plug 104. Generally speaking, a conventional SATA interface circuit may be employed.

In an embodiment, the invention includes modifications to device firmware and host software to enable a host to support an ESATA-FMD via the host-side extended SATA socket. Implementing an ESATA-FMD involves not only providing the appropriate electrical and mechanical connectors (as discussed above) but also the appropriate device firmware.

In an embodiment, the strategy for modifying device firmware to create an ESATA-FMD includes replacing, in an analogous external USB flash memory device, the USB interface with an appropriate SATA interface. Furthermore, it is noted by the inventors that existing USB flash drive or Compact Flash Card already facilitates FAT (File Allocation Table) file system through ATA (Advanced Technology Attachment) commands, which is common to both ATAPI (Advanced Technology Attachment Package Interface) and SCSI commands. By replacing the hard disk drive control logic with flash control logic (which is available from USB flash drive manufacturer using components from NAND flash chip vendors such as Silicon Motion of San Jose, Calif., an ESATA-FMD may be implemented.

FIG. 9 shows a hypothetical system that has an internal hard disk implemented via a first SATA receptacle 1002a/b and a ESATA-FMD implemented via a second SATA receptacle 1004a/b. SATA receptacle 1002a/b represents both the first 7-pin SATA signal receptacle (1002a) and the first 15-pin SATA power receptacle (1002b). SATA receptacle 1004a represents the second 7-pin SATA signal. Connector 1004b represents either the second 15-pin SATA power receptacle (from which ground and +5V may be obtained) or another source for +5V power in the chassis.

As shown, the firmware to implement hard disk 1010 includes five protocol layers: Phy, Link, Transport, Command, and HDD Logic. The firmware to implement ESATA- FMD 1040 includes the same first four layers (Phy, Link, Transport, Command). However, the HDD logic layer associated with hard disk 1010 is replaced by a flash logic layer in ESATA-FMD 1020. For completeness, the host-based adapter 1022 and 1024 associated with these SATA devices are shown. Host-based adapter 1022 and 1024, as well as other components to the left of the host-based adapters in FIG. 10, are conventional and will not be discussed further herein.

As can be appreciated from the foregoing, embodiments of the invention result in a connector-powered SATA-based flash memory device that combines the advantages of flash memory over magnetic hard drive memory with the high speed capability of the SATA interface, which enables the SATA-based flash memory device to exchange data with the host system at a vastly higher throughput rate. By providing extra pins in innovative manners with the connector and providing innovative form factors to the ESATA device plug and the ESATA host-side receptacle, user-friendliness is achieved since both data signals and power can be obtained via a single connector. Furthermore, the ESATA host-side receptacle is advantageously backward compatible with industry-standard SATA plugs, enabling the same receptacle to interoperate with either the connector-powered SATA-based flash memory device(s) disclosed herein or industry-standard SATA devices.

The connector-powered SATA-based flash memory device may be employed to permit executing applications stored thereon, booting up the host system using an operating system stored thereon, key accessing, etc. Currently, up to 4 gigabytes of memory may be packed into a form factor no larger than a 5-piece gum package. Going forward, the memory size of the device is limited only by the rate of progress in semiconductor memory. With such a potentially large and robust memory device and the high speed capability of SATA, applications such as movie streaming is possible. The device may permit implementation of CPRM (Content Protection for Recordable Media) capability. With Port Multiplexer (MP) function, the device can be partitioned into up to 15 drives or more, each implementing the functionality of a hard disk drive or a CD-ROM or a DVD-ROM drive.

While this invention has been described in terms of several embodiments, there are alterations, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A Serial Advanced Technology Attachment-based (SATA-based) flash memory device configured for coupling with a host machine, comprising:
  semiconductor memory configured for storing data;
  a plug having therein a plug cavity, said plug cavity having a generally L shape cavity for housing a set of SATA industry-standard signal pins in respective industry-standard positions with respect to said plug cavity, at least a subset of said set of SATA industry-standard signal pins being configured to carry address and data signals to facilitate storing said data in said semiconductor memory, said L shape cavity being characterized by a longer substantially rectangular cavity coupled with a shorter substantially rectangular cavity, said plug additionally having a set of power pins that represents a plurality of power pins and includes at least a first power pin, said set of power pins being positioned in said shorter substantially rectangular cavity, wherein a contacting surface of contacting surfaces of said set of power pins faces sides of said set of SATA industry-standard signal pins, said SATA-based flash memory device employing a SATA protocol for exchanging said data with said host machine using said set of SATA industry-standard signal pins, said SATA-based flash memory device obtaining power via said set of power pins.

2. The SATA-based flash memory device of claim 1 wherein said first power pin of said set of power pins is disposed in said shorter substantially rectangular cavity of said plug cavity.

3. The SATA-based flash memory device of claim 2 wherein said set of power pins further including a second power pin also disposed in said shorter substantially rectangular cavity of said plug cavity.

4. The SATA-based flash memory device of claim 1 wherein said first power pin is disposed adjacent to a first interior surface of said longer substantially rectangular cavity of said plug cavity, said first interior surface being parallel to and opposite to a second interior surface of said longer substantially rectangular cavity, said set of SATA industry-standard signal pins being disposed adjacent to said second interior surface.

5. The SATA-based flash memory device of claim 4 wherein said set of power pins further including a second power pin also disposed adjacent to said first interior surface of said longer substantially rectangular cavity.

6. The SATA-based flash memory device of claim 1 wherein said first power pin is disposed adjacent to a first exterior surface of said plug, said first exterior surface being parallel to and opposite to a first interior surface of said longer substantially rectangular cavity, said set of SATA industry-standard signal pins being disposed adjacent to said first interior surface.

7. The SATA-based flash memory device of claim 6 wherein said set of power pins further including a second power pin also disposed adjacent to said first interior surface of said longer substantially rectangular cavity.

8. A Serial Advanced Technology Attachment-based (SATA-based) flash memory arrangement configured for coupling with a host machine, comprising:
  a SATA-based flash memory device having semiconductor memory configured for storing data and a plug having therein a plug cavity, said plug cavity having a generally L shape cavity for housing a set of SATA industry-standard signal pins in respective industry-standard positions with respect to said plug cavity, at least a subset of said set of SATA industry-standard signal pins being configured to carry address and data signals to facilitate storing said data in said semiconductor memory, said L shape cavity being characterized by a longer substantially rectangular cavity joined with a shorter substantially rectangular cavity, said plug additionally having a set of power pins that represents a plurality of power pins and includes at least a first power pin, said set of power pins being positioned in said shorter substantially rectangular cavity, wherein a contacting surface of contacting surfaces of said set of power pins faces sides of said set of SATA industry-standard signal pins, said SATA-based flash memory device employing a SATA protocol for exchanging said data with said host machine using said set of SATA industry-standard signal pins, said SATA-based flash memory device obtaining power via said set of power pins; and a coupler arrangement having at least three coupler connectors, a first coupler connector of said three coupler connectors being configured for connecting with said plug of said SATA-based flash memory device, a second coupler connector of said three coupler connectors being configured to be coupled with an industry-standard 7-pin SATA receptacle on said host machine, a third coupler connector of said three coupler connector being configured to be coupled a power source on said host machine, said power source representing a connector on said host machine that can provide said power to said set of power pins.

9. The SATA-based flash memory arrangement of claim 8 wherein said power source on said host machine represents a Universal Serial Bus connector.

10. The SATA-based flash memory arrangement of claim 8 wherein said power source on said host machine represents a keyboard connector.

11. The SATA-based flash memory arrangement of claim 8 wherein said power source on said host machine represents a mouse connector.

12. The SATA-based flash memory arrangement of claim 8 wherein said first power pin is disposed in said shorter substantially rectangular cavity of said plug cavity.

13. The SATA-based flash memory arrangement of claim 12 wherein said set of power pins further including a second power pin also disposed in said shorter substantially rectangular cavity of said plug cavity.

14. The SATA-based flash memory arrangement of claim 8 wherein said first power pin is disposed adjacent to a first interior surface of said longer substantially rectangular cavity of said plug cavity, said first interior surface being parallel to and opposite to a second interior surface of said longer substantially rectangular cavity, said set of SATA industry-standard signal pins being disposed adjacent to said second interior surface.

15. The SATA-based flash memory arrangement of claim 14 wherein said set of power pins further including a second power pin also disposed adjacent to said first interior surface of said longer substantially rectangular cavity.

16. The SATA-based flash memory arrangement of claim 8 wherein said first power pin is disposed adjacent to a first exterior surface of said plug, said first exterior surface being parallel to and opposite to a first interior surface of said longer substantially rectangular cavity, said set of SATA industry-standard signal pins being disposed adjacent to said first interior surface.

17. The SATA-based flash memory arrangement of claim 16 wherein said set of power pins further including a second power pin also disposed adjacent to said first interior surface of said longer substantially rectangular cavity.

18. A Serial Advanced Technology Attachment-based (SATA-based) host-side receptacle configured to provide both power and data signals to an external SATA device, comprising:
  an outer housing;
  a set of SATA industry-standard signal pins;
  a center portion inside said outer housing, said center portion having a generally L shape island for housing said set of SATA industry-standard signal pins in respective industry-standard positions with respect to said center portion, at least a subset of said set of SATA industry-standard signal pins being configured to permit communication said external SATA device using a SATA protocol;
  a set of power pins that represents a plurality of power pins and includes at least a first power pin, said L shape cavity being characterized by a longer substantially rectangular cavity coupled with a shorter substantially rectangular cavity, said set of power pins being positioned in said shorter substantially rectangular cavity, wherein a contacting surface of contacting surfaces of said set of power pins faces the sides of said set of SATA industry-standard signal pins, said set of power pins being disposed inside said outer housing and configured to provide said power to said external SATA device, whereby said SATA-based host-side receptacle is configured to be backward compatible with an industry-standard 7-pin SATA plug and said set of power pins is positioned inside said center portion such that they are electrically isolated from pins of said industry-standard 7-pin SATA plug when said industry-standard 7-pin SATA plug is plugged into said SATA-based host-side receptacle.

19. The SATA-based host-side receptacle of claim 18 wherein said first power pin of said set of power pins being disposed on said shorter substantially rectangular portion of said L shape island.

20. The SATA-based host-side receptacle of claim 19 wherein said set of power pins further including a second power pin also disposed on said shorter substantially rectangular portion of said of said L shape island.

21. The SATA-based host-side receptacle of claim 18 wherein said first power pin of said set of power pins is disposed adjacent to a first surface of said longer substantially rectangular portion, said first surface being parallel to and different from a second surface of said longer substantially rectangular cavity, said set of SATA industry-standard signal pins being disposed adjacent to said second surface.

22. The SATA-based host-side receptacle of claim 21 wherein said set of power pins further including a second power pin also disposed adjacent to said first surface of said longer substantially rectangular portion.

23. The SATA-based host-side receptacle of claim 18 wherein said first power pin is disposed adjacent to a first interior-facing surface inside said outer housing, said first interior-facing surface being parallel to a surface of said longer substantially rectangular portion, said set of SATA industry-standard signal pins being disposed adjacent to said surface of said longer substantially rectangular portion, said first interior surface being different from a surface of said L shape island.

24. The SATA-based host-side receptacle of claim 23 wherein said set of power pins further including a second power pin also disposed adjacent to said first interior-facing surface.

* * * * *